United States Patent
Misra (10) Patent No.: US 10,810,128 B2
(45) Date of Patent: Oct. 20, 2020

(54) INVALIDATION DATA AREA FOR CACHE

(71) Applicant: Western Digital Technologies, Inc., San Jose, CA (US)

(72) Inventor: Pulkit Misra, Belmont, MA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/455,635

(22) Filed: Jun. 27, 2019

(65) Prior Publication Data

US 2019/0317900 A1 Oct. 17, 2019

Related U.S. Application Data

(62) Division of application No. 15/357,155, filed on Nov. 21, 2016, now Pat. No. 10,445,242, which is a division of application No. 14/316,256, filed on Jun. 26, 2014, now Pat. No. 9,501,418.

(51) Int. Cl.
*G06F 12/0891* (2016.01)
*G06F 12/121* (2016.01)
*G06F 12/0866* (2016.01)
(Continued)

(52) U.S. Cl.
CPC ...... *G06F 12/0891* (2013.01); *G06F 11/1471* (2013.01); *G06F 12/0815* (2013.01);
(Continued)

(58) Field of Classification Search
CPC ............. G06F 12/0891; G06F 11/1471; G06F 12/0815; G06F 12/0866; G06F 12/121;
(Continued)

(56) References Cited

U.S. PATENT DOCUMENTS

| 9,501,418 B2 | 11/2016 | Zuberi |
| 2009/0287890 A1 | 11/2009 | Beckett et al. |

(Continued)

FOREIGN PATENT DOCUMENTS

| CN | 1851673 | 10/2006 |
| CN | 1896972 | 1/2007 |

(Continued)

OTHER PUBLICATIONS

British Office Action from Great Britain Patent Application No. GB1701188.3, dated May 22, 2017.

(Continued)

*Primary Examiner* — Eric Cardwell
(74) *Attorney, Agent, or Firm* — Morgan, Lewis & Bockius LLP (57) ABSTRACT

The present disclosure relates to caches, methods, and systems for using an invalidation data area. The cache can include a journal configured for tracking data blocks, and an invalidation data area configured for tracking invalidated data blocks associated with the data blocks tracked in the journal. The invalidation data area can be on a separate cache region from the journal. A method for invalidating a cache block can include determining a journal block tracking a memory address associated with a received write operation. The method can also include determining a mapped journal block based on the journal block and on an invalidation record. The method can also include determining whether write operations are outstanding. If so, the method can include aggregating the outstanding write operations and performing a single write operation based on the aggregated write operations.

8 Claims, 7 Drawing Sheets

(51) Int. Cl.
*G06F 11/14* (2006.01)
*G06F 12/0815* (2016.01)

(52) U.S. Cl.
CPC ........ *G06F 12/0866* (2013.01); *G06F 12/121*
(2013.01); *G06F 2212/1024* (2013.01); *G06F 2212/1041* (2013.01); *G06F 2212/60* (2013.01); *G06F 2212/62* (2013.01)

(58) Field of Classification Search
CPC ..... G06F 2212/1024; G06F 2212/1041; G06F 2212/60; G06F 2212/62
See application file for complete search history.

(56) References Cited

U.S. PATENT DOCUMENTS

| | | | |
|---|---|---|---|
| 2010/0106896 A1 | 4/2010 | Koch et al. | |
| 2011/0191522 A1* | 8/2011 | Condict | G06F 12/123 711/103 |
| 2014/0047193 A1* | 2/2014 | Gross | G06F 12/0893 711/144 |

FOREIGN PATENT DOCUMENTS

| | | |
|---|---|---|
| CN | 101201800 | 6/2008 |
| JP | 2008-293472 | 12/2008 |
| WO | WO 97/01139 | 1/1997 |
| WO | WO 2015/138375 | 9/2015 |

OTHER PUBLICATIONS

Chinese Office Action from Chinese Patent Application No. 201510653958.5, dated Oct. 27, 2017, 12 pages.

* cited by examiner

FIG. 5

INVALIDATION DATA AREA FOR CACHE

CROSS-REFERENCE TO RELATED APPLICATION(S)

This application is a divisional application of U.S. application Ser. No. 15/357,155, filed on Nov. 21, 2016, now U.S. Pat. No. 10,445,242, which is a divisional of U.S. application Ser. No. 14/316,256, filed on Jun. 26, 2014, now U.S. Pat. No. 9,501,418, the entirety of each of which is incorporated herein by reference for all purposes.

BACKGROUND

Field of the Disclosure

The present disclosure relates to systems and methods for caching, and specifically to providing a region for processing invalidated data for a cache.

Related Disclosure

A cache can generally be used to speed access when reading or writing data to underlying storage such as a flash memory or hard drive. Upon receiving a write operation from a host, the cache can update a stored data block to track whether the data block has changed (i.e., whether the data block is valid or invalid). Sometimes, the cache can write the new data from the write operation to another entry in the cache, and defer evicting or deleting the old cache entry. This is because evicting or deleting the old cache entry can cause performance slowdowns while the cache waits for the underlying storage to update. Using this deferral, the cache can finish processing the write operation and return control sooner to the host.

SUMMARY

Embodiments of the present disclosure relate to caches, methods, and systems for using an invalidation data area.

In one embodiment, the present disclosure relates to a cache. The cache can include a journal and an invalidation data area. The journal can be configured for tracking data blocks stored in the cache. The invalidation data area can be configured for tracking invalidated data blocks associated with the data blocks tracked in the journal, where the invalidation data area is on a separate region of the cache from the journal.

In one embodiment, the present disclosure relates to a method for invalidating a block in a cache. The method can include determining a journal block tracking a memory address associated with a received write operation, where the journal block is stored in a journal of the cache. The method can also include determining a mapped journal block based on the determined journal block and based further on an invalidation record, where the mapped journal block and the invalidation record are stored in an invalidation data area of the cache. The method can also include determining whether write operations are outstanding. If write operations are outstanding, the method can include aggregating the outstanding write operations and performing a single write operation based on the aggregated write operations. If write operations are not outstanding, the method can include performing the received write operation.

In one embodiment, the present disclosure relates to a method for recovery of a cache. The method can include determining an initial reconstruction of the cache based on a journal of the cache. For each mapped journal block in an invalidation record in an invalidation data area of the cache, the method can include determining whether a corresponding data block tracked in the journal is valid, based on the mapped journal block. If the corresponding data block is determined not to be valid, the method can include evicting the corresponding data block from the initial reconstruction of the cache.

The embodiments described herein can include additional aspects. For example, the journal can be configured for tracking metadata for the data blocks, where the metadata can include a memory address corresponding to the data block, and the invalidation data area can be configured for tracking metadata associated with the invalidated data blocks, where the associated metadata can include a memory address corresponding to the invalidated data block. The journal can be configured for tracking the data blocks using journal blocks, where the journal blocks can be configured for storing the metadata for the data blocks, and the invalidation data area can be configured for tracking the metadata associated with the invalid data blocks using invalidation records and mapped journal blocks, where the mapped journal blocks can be configured for storing the associated metadata for the invalid data blocks, and where the invalidation records can be configured for storing the mapped journal blocks. The metadata tracked in the journal can further include an index into a collection of metadata stored in each journal block, and the metadata tracked in the invalidation data area can further include an index into a collection of metadata stored in each mapped journal block. The cache can be configured to determine an invalidation record number associated with an invalidation record in the invalidation data area based on a corresponding journal block number associated with a journal block. The cache can be configured to determine a mapped journal block number associated with a mapped journal block in the invalidation area based on a corresponding journal block number associated with a journal block. The index tracked in the journal can be selected to have the same value as the index tracked in the invalidation data area. The memory address tracked in the invalidation data area can be truncated compared to the memory address tracked in the journal, and the truncation can be determined based on a storage size of an underlying storage device being cached or on an offset determined based on a memory address of a block in the underlying storage device. Determining the mapped journal block can include determining a mapped journal block number for the mapped journal block by determining an invalidation record number by dividing a journal block number associated with the determined journal block by a capacity of the invalidation record in the invalidation data area and computing a ceiling function of the result of the division, where the invalidation record number identifies the invalidation record, and determining the mapped journal block number by computing a modulo operation of the journal block number with the capacity of the invalidation record. Determining whether write operations are outstanding can include retrieving a field from an in-RAM data structure corresponding to the invalidation record. Aggregating the outstanding write operations can include queuing subsequent write operations, identifying write operations that operate on the same data block, and determining the single write operation based on the write operations that operate on the same data block. The invalidation data area can be on a separate region of the cache from the journal. The cache can be a content locality cache, and the journal can tracks at least one of associated data blocks and independent data blocks in the content locality cache. Determining the initial reconstruction can include recovering data blocks and metadata describing the data blocks, where the recovered data blocks and metadata are recovered from the journal. Determining whether the corresponding data block tracked in the journal is valid can include comparing metadata describing the corresponding data block tracked in the journal with metadata describing the corresponding data block tracked in the mapped journal block. Comparing the metadata can include comparing a first memory address and first index for the corresponding data block tracked in the journal with a second memory and second index tracked in the mapped journal block.

BRIEF DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

DETAILED DESCRIPTION

The present disclosure relates to systems and methods for using an invalidation data area for a cache. In some embodiments, the cache can include a journal area and an invalidation data area. The journal area can be a log-based journal for tracking cache updates and cache operations persistently, in case of a need for cache recovery. The invalidation data area can store invalidation records for cache blocks that are being removed, or evicted, from the cache. The invalidation data area can generally track information about cached data blocks that were invalidated, for example while caching is paused or otherwise interrupted. The invalidation data area can accompany the journal area and occupy a separate region of the cache. Furthermore, some embodiments of the invalidation data area can store a subset of metadata that corresponds to a full set of metadata generally stored in the journal.

Figure 1:
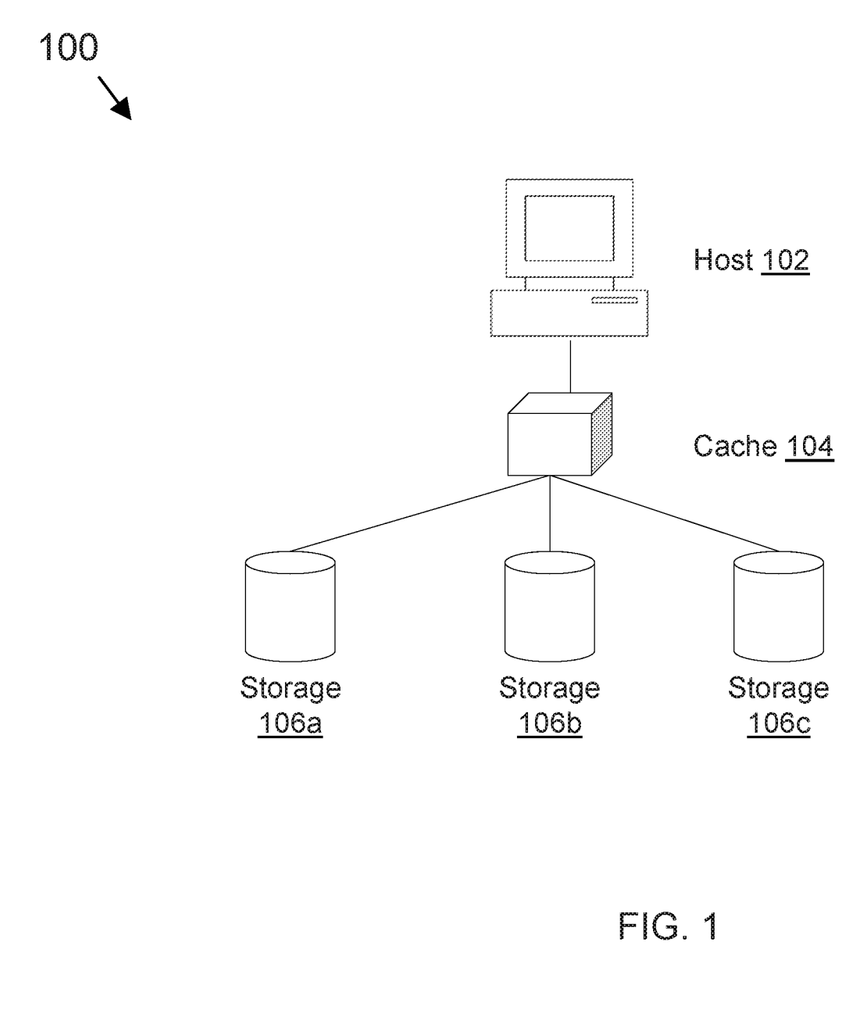
FIG. 1 illustrates an example system including a cache, in accordance with some embodiments of the present disclosure.

FIG. 1 illustrates an example system 100 including cache 104, in accordance with some embodiments of the present disclosure. System 100 includes host 102, cache 104, and storage 106a-10c. Host 102 transmits read and write requests to cache 104. Cache 104 processes the requests to read and write data to and from underlying storage 106a-10c. For example, to process a read request, cache 104 can determine whether data corresponding to a requested memory address is stored in cache. If the requested memory address is cached, this situation can sometimes be referred to as a "read hit." If the requested memory address is not cached, this situation can be referred to as a "read miss." Upon a read hit, cache 104 can return the requested data faster directly from cache 104. In contrast, upon a "read miss," cache 104 can read the requested data from the slower storage 106a-10c.

Similarly, to process a write request, cache 104 can determine whether a requested memory address is already stored in the cache. If the requested memory address is cached, this situation can sometimes be referred to as a "write hit." If the requested memory address is not cached, this situation can be referred to as a "write miss."

Figure 2A:
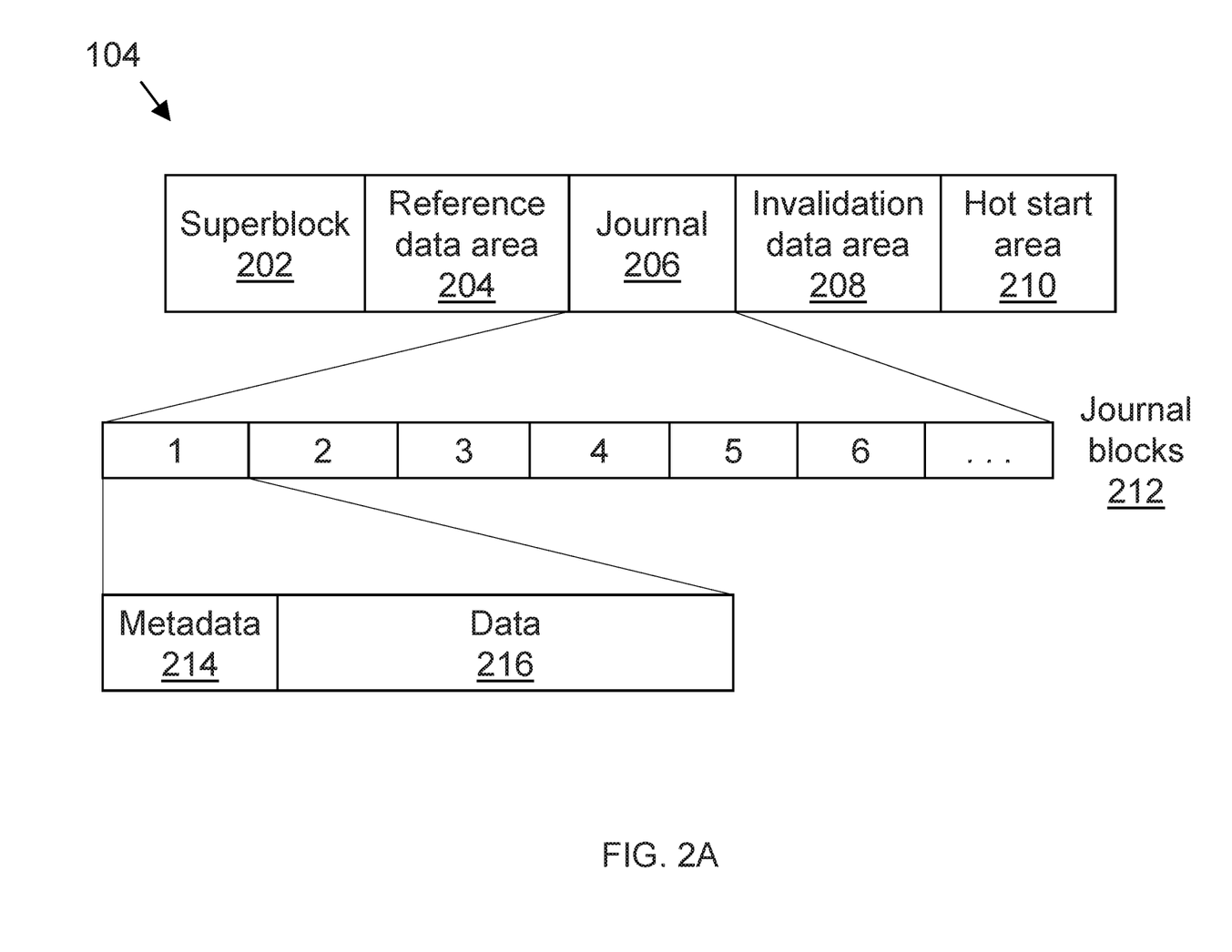
FIGS. 2A-2B illustrate example block diagrams of a cache, in accordance with some embodiments of the present disclosure.

FIG. 2A illustrates an example block diagram of cache 104, in accordance with some embodiments of the present disclosure. In some embodiments, cache 104 can include superblock 202, reference data area 204, journal 206, invalidation data area 208, and hot start area 210. Journal 206 can include journal blocks 212. Journal blocks 212 can include metadata 214 and data 216.

Cache 104 can use a journal-based approach to provide persistence, so that cache 104 can be recovered if a need arises. Some embodiments of journal 206 can be subdivided into journal blocks 212. For example, journal blocks 212 can have size about 256 kB. Other sizes can also be used in relation to the overall size of cache 104. If a journal block 212 has size about 256 kB, metadata 214 can take up about 4 kB in size and data 216 can use about 252 kB. As before, other sizes can also be used based on the needs of journal 206 and cache 104.

Data 216 can include the contents associated with a cache block that is tracked in journal 206. Examples of metadata 214 can include a memory address (e.g., a logical block address (LBA)), a cache block type, an offset, and a hash value for error correction. An example of a cache block type can include tracking that a cache block is an independent block or an associated block. An independent block and/or an associated block can be used with a content-locality cache. In some embodiments, cache 104 can cache based on similarity of content of a cache block (content locality). An associated block can track changes, or deltas, between baseline reference blocks. This content-locality caching can be in addition to determining how recently a cache block was last used (temporal locality) or identifying cache blocks with similar memory addresses (spatial locality). An independent block can be a block cached based on temporal locality and/or spatial locality but not content locality. The offset can identify a specific memory block of interest or specific memory location of interest within a memory block. For example, the offset can be similar to a pointer into data 216 that refers to specific data of interest.

Because metadata 214 and data 216 can be combined into a single journal block 212, journal writes can occur in chunks or batches, and data and metadata writes can be combined into a single write operation. The storage of both metadata 214 and data 216 in a single journal block 212 can therefore provide an about 50% reduction in write operations over having to write metadata 214 and data 216 separately to different locations.

In some embodiments, journal 206 can be a circular journal. That is, cache 104 can write to journal 206 generally sequentially, and upon reaching the end of journal 206, the next write operation can wrap around to a starting point to begin the next round. Metadata and data corresponding to write hits on cached data can be written on a new journal block 212 in journal 206. Sequential writes can avoid a need otherwise to read metadata 214 stored in each journal block 212. However, support for sequential writes can also mean that journal 206 can include multiple journal blocks 212 that correspond to the same cache block. For example, a first write to memory address 8 might be tracked in journal block 1. A subsequent write to the same memory address, memory address 8, might be tracked in journal block 3 (for example if cache 104 processed intervening cache block updates that used journal block 2). Even if journal blocks 1 and 2 also track metadata and data corresponding to memory address 8, cache 104 can save the processing time for the existing journal blocks. Instead, the design of journal 206 allows cache 104 to write the entry for journal block 3 directly to journal 206 without having to read additional metadata. Therefore, the sequential design can improve performance.

Journal 206 can also generally support multiple storage devices. That is, journal 206 does not differentiate between cache blocks from different cached target storage devices of interest. This multiple drive support can generally lead to better space utilization on journal 206, as the multiple drive support generally removes a need to pre-reserve space for different storage devices. Otherwise, journal 206 could contain unused space that is pre-reserved for a storage device that did not have a need for the space, which could lead to an inefficient use of resources.

However, journal 206 without invalidation data area 208 can also exhibit decreased performance. One example use case includes when cache 104 can be caching multiple storage devices and operating in write-back mode (i.e., deferring writing updated cache data to underlying storage). If eviction from cache 104 to any storage device fails, then the system may not cache new data, even new data for other storage devices. Instead, the system may preserve the old data, so that it can be written back to the storage device. The log-based non-volatile implementation described earlier can generally expect eviction to proceed sequentially. In some embodiments, cache 104 may not discard data for an unavailable storage device unless the user explicitly instructs otherwise.

However, even with an unavailable storage device, cache 104 can continue to keep servicing I/O operations to provide transparent service to other storage devices that are still available. This transparent caching can be achieved as follows:

1) Upon a cache miss, cache 104 can pass through the I/O operation.
2) Upon a read hit, cache 104 can service the requested read operation from cache 104.
3) Upon a write hit, cache 104 can either (a) update or (b) invalidate the requested data from cache.

Either operation can lead to a read-modify-write cycle for metadata 214, and a write operation for data 216 (for example, in the case of update request). Thus, any write hit could need 1 read and 1 write (for an invalidate) or 2 writes (for an update). Both scenarios can represent a performance penalty overall. Any of these approaches can divert from the log-based approach using journal 206 without invalidation data area 208 to write data. Furthermore, the scenarios can exhibit a risk of data loss, as the operations are not atomic and could benefit from being performed in a serial fashion.

Figure 2B:
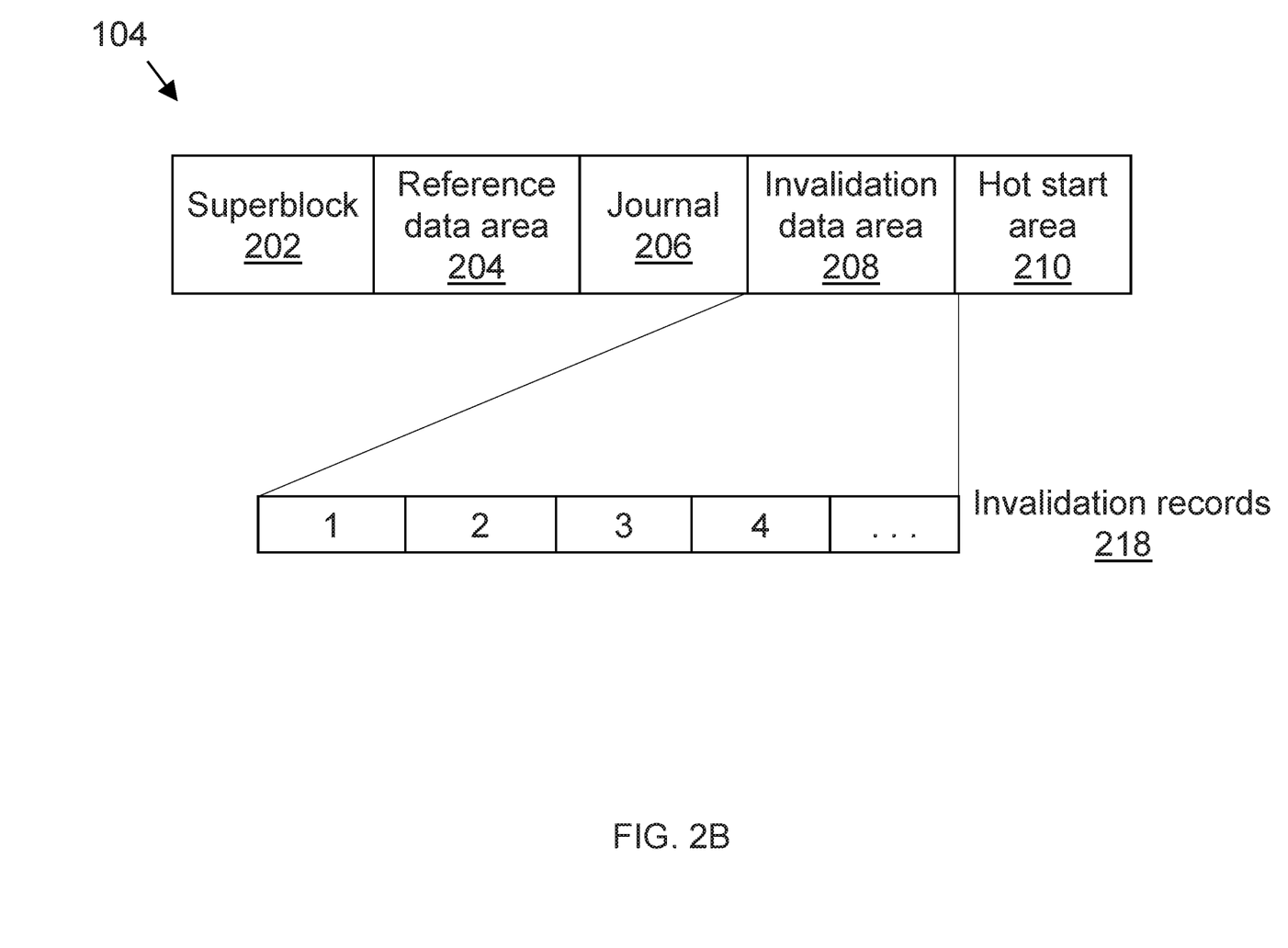

FIG. 2B illustrates an example block diagram of cache 104, in accordance with some embodiments of the present disclosure. Cache 104 can include invalidation data area 208. Invalidation data area 208 can generally store invalidation records 218 for cache blocks that are being deleted, or evicted, from cache 104.

Invalidation data area 208 can include a separate region of cache 104 (e.g., separate from journal 206). The system can map underlying journal blocks into this separate region using invalidation records 218. In some embodiments, the cache can implement the separate region using a dedicated, predetermined namespace.

Accordingly, invalidation data area 208 can exhibit the following benefits:

1) Maintains a log-based approach for writing journal data. That is, the design of invalidation data area 208 can convert write operations that otherwise could be potentially random update or invalidate writes into sequential writes on the cache device.
2) Maps multiple journal blocks into a single invalidation record block (shown in FIG. 3A). For example, some embodiments of invalidation data area 208 can map three journal blocks into one invalidation record. Consequently, the space used for invalidation data area 208 can be about 0.5% of an overall size of cache 104.
3) As the size of invalidation data area 208 can be a small fraction of the overall size of cache 104, invalidation data area 208 can generally be stored entirely in RAM. Furthermore, storing invalidation data area 208 generally in RAM can remove a need for a read operation during invalidation. Even if invalidation data area is not stored generally in RAM, the system can still exhibit a 66% reduction in the number of reads required. This is because records for three journal blocks can be mapped to one invalidation block.
4) Packing invalidation record block entries can reduce write overhead, such that multiple entries are written in one write operation. Also, there can be a 66% reduction in a number of writes.

Generally, invalidation data area 208 can provide a transparent solution for error handling and maintaining data consistency. Furthermore, invalidation data area 208 can provide these benefits without generally introducing a large performance penalty in exchange.

Figure 3A:
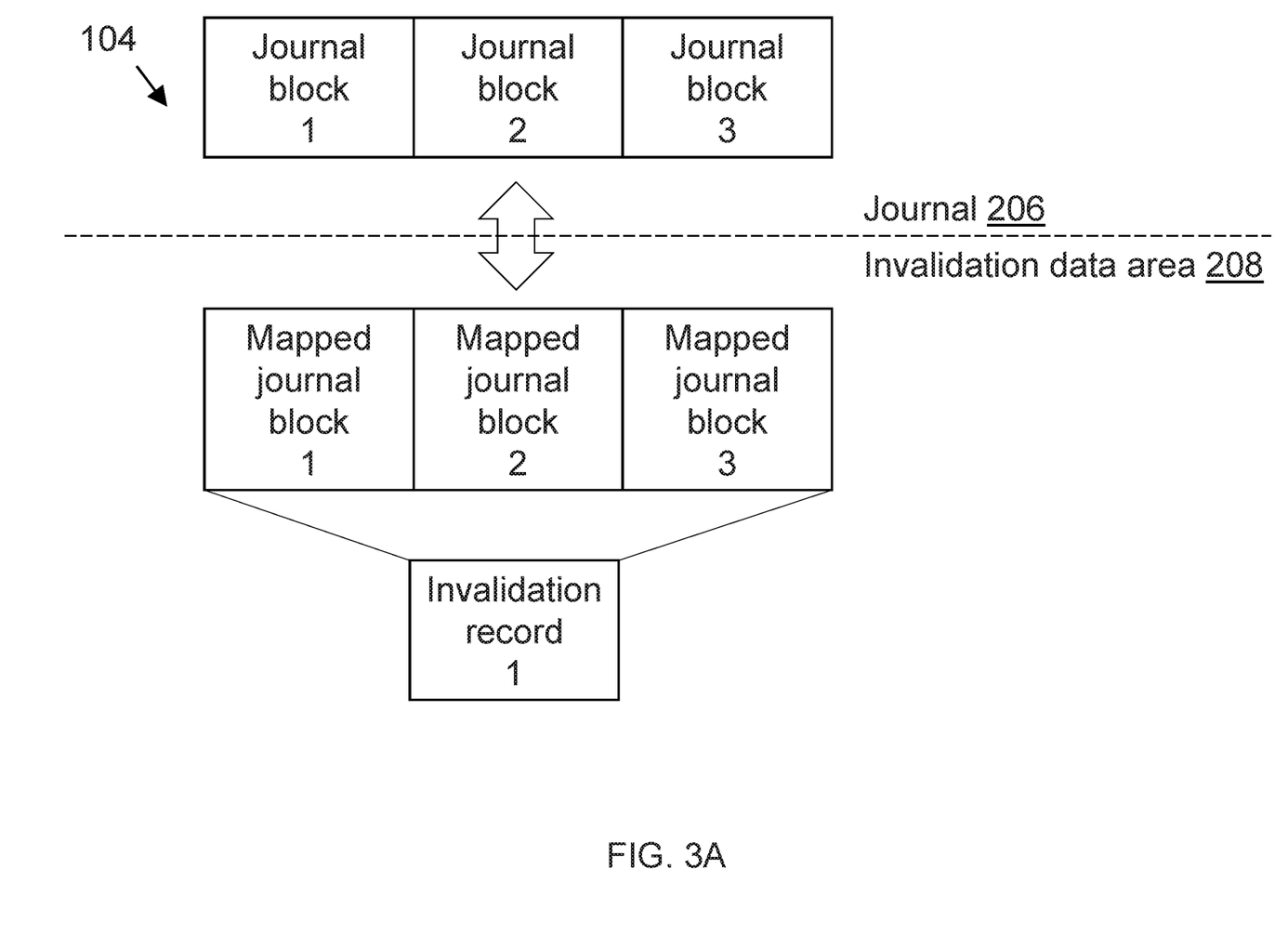
FIGS. 3A-3B illustrate example mappings between a journal and an invalidation data area, in accordance with some embodiments of the present disclosure.

FIG. 3A illustrates an example mapping between journal 206 and invalidation data area 208, in accordance with some embodiments of the present disclosure. FIG. 3A includes journal 206 and invalidation data area 208. Journal 206 includes journal blocks 1-3. Invalidation data area 208 includes invalidation record 1. Invalidation record 1 includes mapped journal blocks 1-3.

In some embodiments, invalidation records can generally be stored on cache 104, in the separate invalidation data area. The invalidation records can generally use mapped journal blocks associated with an invalidation record, to represent multiple journal blocks associated with journal 206. For example, journal block 1 can correspond to mapped journal block 1, journal block 2 can correspond to mapped journal block 2, and journal block 3 can correspond to mapped journal block 3. Furthermore, mapped journal blocks 1-3 can require less metadata to be stored than the corresponding underlying journal blocks 1-3. Accordingly, in some embodiments the system can select a subset of metadata from underlying journal blocks 1-3, so that all three mapped journal blocks can be stored in invalidation record 1.

Figure 3B:
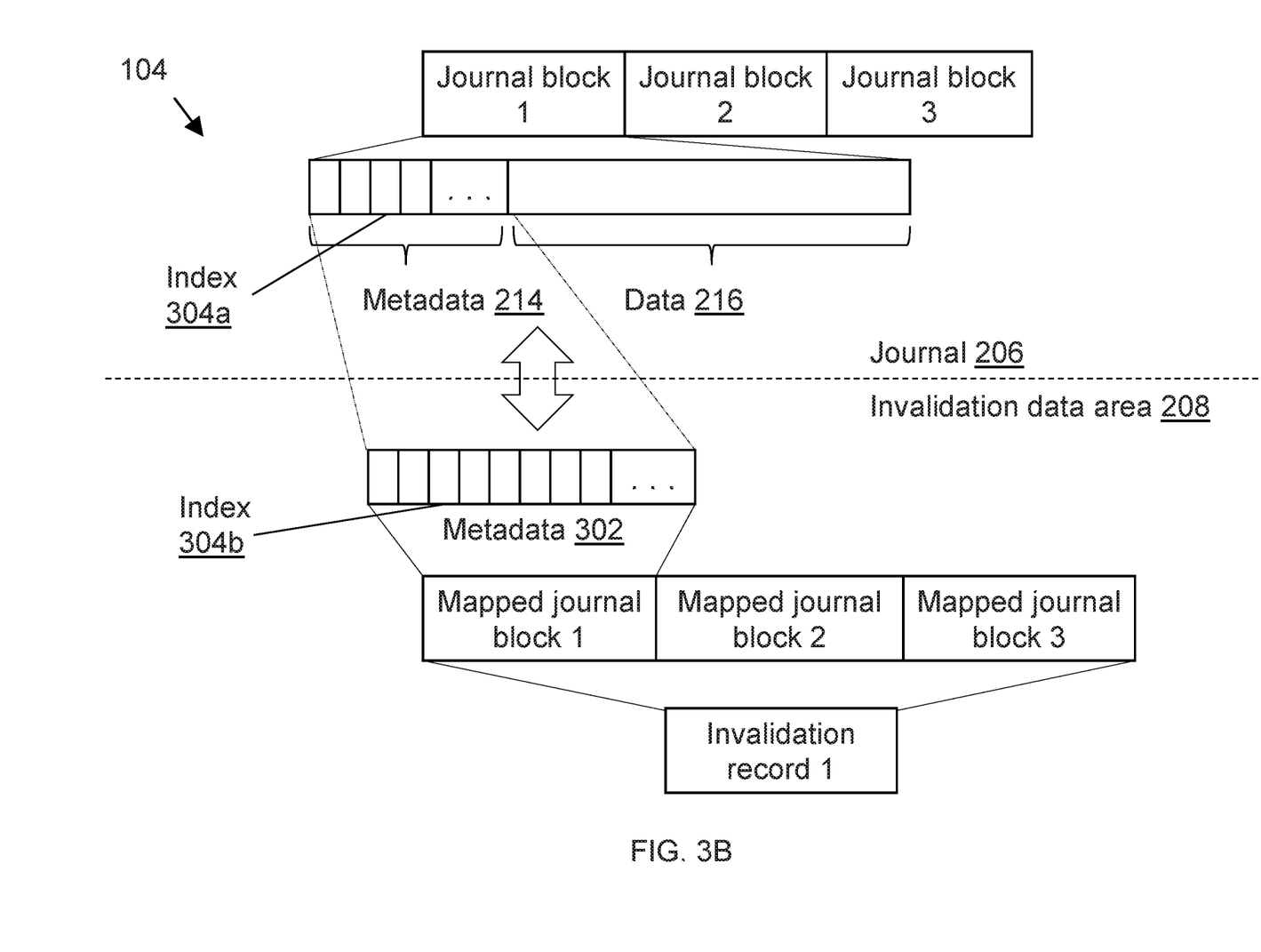

FIG. 3B illustrates a further example mapping between journal 206 and invalidation data area 208, in accordance with some embodiments of the present disclosure. FIG. 3B includes journal 206 and invalidation data area 208. Journal 206 includes journal block 1 with metadata 214 and data 216. Invalidation data area 208 includes invalidation record 1. Invalidation record 1 includes mapped journal block 1. Mapped journal block 1 includes metadata 302.

Invalidation record 1 can include both a version stored on cache and a relatively faster version loaded into random access memory (RAM). The in-RAM data structure can generally improve performance and reduce a need to read data from the relatively slower journal or from cache 104. In some embodiments, an example definition of invalidation record 1 can include the following.

```
/* As stored on cache 104 */
struct invalidation_record_block {
        unsigned char checksum[16]; // checksum of the entire
        block with salt
        struct mapped_journal_block journal_block[3];
}
```

An example invalidation record can include multiple mapped journal blocks ("journal block"), and an error correction code ("checksum").

In some embodiments of the invalidation record data structure, an example definition of the mapped journal block referred to in the invalidation record data structure can include:

```
struct mapped_journal_block {
        unsigned long long epoch; // journal epoch during
        the time of writing.
        unsigned int target_lba[MAX_JOURNAL_ENTRY];
    // store offsets (4k aligned LBA's)
}
```

The mapped journal block can include a collection (e.g., an array) of memory addresses and offsets ("target_lba"). The memory addresses can identify a memory block of interest, and the offsets can identify specific memory blocks of interest or specific memory locations of interest within the memory blocks. The collection of memory addresses and offsets in the mapped journal block can map to a corresponding collection of memory addresses and offsets stored in underlying journal blocks. The mapped journal block can also include a timestamp ("epoch") that can match a corresponding timestamp stored in the underlying journal block.

In some embodiments, the in-RAM data structure representing an invalidation record can include the following.

```
/* In RAM representation of invalidation record block */
struct in_ram_invalidation_record_block {
        unsigned char valid:1; // whether this block has been
        written to before
        unsigned char outstanding:1; // Max value can only be
        1 at any time.
        void *waiting_creqs; // Waiting requests if there's already
        an outstanding write
        void *irb_cache_device; // buffer containing the
        IRB on the cache device
}
```

The in-RAM data structure can generally improve performance and reduce a need to read data from the relatively slower journal or from cache 104.

The mapped journal block can represent a journal block. In some embodiments, an invalidation record can contain multiple mapped journal blocks. For example, FIG. 3A illustrates an invalidation record having a capacity of three mapped journal blocks (such that there can be a 3-to-1 mapping from journal blocks to an invalidation record). The mapped journal block can store entries of memory addresses that have been invalidated in cache 104. In some embodiments, the memory addresses can be logical block addresses (LBAs). Although the present disclosure describes tracking three journal blocks using a single invalidation record, the invalidation record can contain any number of mapped journal blocks, for example determined based on the subset of metadata chosen to be stored in the mapped journal block. An example journal block can be about 256 kB in size and an example invalidation record can be about 4 kB in size. Because there can be a 3-to-1 mapping between journal blocks and invalidation records, invalidation data area 208 can be space efficient. For example, invalidation data area 208 can use only about 4 kB to account for 768 kB (3 journal blocks×256 kB per journal block) of data in journal 206. Accordingly, space requirements for invalidation data area 208 can be about 0.52% (4 kB/768 kB). Moreover, the 3-to-1 mapping between mapped journal blocks to invalidation records can reduce the number of read and write operations performed during the invalidation process by about 66%. In some embodiments, due to the small size of invalidation data area 208 and the efficient space allocation, invalidation data area 208 can be stored entirely in random access memory (RAM) to reduce or even eliminate altogether the number of read operations to cache 104.

In some embodiments, invalidation data area 208 can store a subset of metadata 214 that is tracked in journal 206. This efficiency can contribute further to the small size of invalidation data area 208. For example, metadata 214 tracked in journal 206 can include a memory address (e.g., a logical block address (LBA)), a cache block type, an offset, and a hash value for error correction. In contrast, in some embodiments metadata 302 tracked in invalidation data area 208 can include a subset of metadata 214 tracked in journal 206. For example, the system can elect to track only a corresponding memory address in metadata 302. Tracking only a subset of metadata can improve the space efficiency or capacity of invalidation data area 208.

Further modifications depending on uses for and metadata stored in journal 206 and invalidation data area 208 can further affect this size. Examples of modifications can include increasing the size of journal blocks, reducing the size of memory addresses stored in a mapped journal block, etc. Some embodiments of the system can truncate the size of memory addresses stored in a mapped journal block. In one implementation, truncation can be based on a storage size of the underlying storage device. For example, if the storage device is sufficiently small, the system can store memory addresses of about four bytes in the mapped journal block, compared with a fully expanded memory address of about eight bytes, stored in a corresponding journal block.

In another implementation, truncation can include determining an offset based on a corresponding memory address used in underlying storage, and storing the offset instead of the memory address. Embodiments of the cache can store data blocks in sizes of about 4 kB. (If an I/O request is for a smaller size, then the cache can retrieve the remaining data associated with the data block from the storage and can cache the entire contents of the 4 kB data block.) Consequently, in some embodiments the truncation can include converting a memory address (such as an LBA) of underlying storage into offsets. In some embodiments, the offsets can be about 4 kB. For example, offset 0 can represent for the first 4 kB on the storage device, offset 1 can represent the next 4 kB on the storage device, etc. Accordingly, the cache can convert a memory address of, for example, a 512 byte LBA, to a next available 4 kB aligned LBA. Rather than store a full LBA, the system can convert a full LBA to an offset that uses a smaller number of bytes, and store the offset in the invalidation record and mapped journal block. For example, LBA 0-7 in underlying storage can correspond to LBA 0 in the cache along with an optional offset. In some embodiments of the invalidation data area, an offset field of 4 B in size can thereby address up to 16 terabytes of underlying storage ($2^{32} \times 4,096$). For larger storage devices, some embodiments of the system can increase the cache block size to about 8 kB or higher, increase the offset size to about 5 bytes, etc.

Some embodiments of cache 104 can invalidate cache blocks by determining a mapping between journal 206 and invalidation data area 208. That is, cache 104 can determine an appropriate invalidation record, mapped journal block, and corresponding index in invalidation data area 208 for a data block, based on the journal block and index in journal 206.

For example, assume cache 104 performs an invalidation of a data block residing in journal block 1, at index 3 (304a). Based on the journal block and index in journal 206, cache 104 can generally determine the corresponding invalidation record, mapped journal block, and index in the mapped journal block. First, cache 104 can determine an invalidation record based on the corresponding journal block. Because journal blocks can map 3-to-1 to the capacity of invalidation records, some embodiments of cache 104 can perform a division operation and ceiling function (i.e., round up) to determine the corresponding invalidation record. For example, for journal block 1 the system can compute 1/3=0.33 . . . and [0.33 . . . ]=1, which maps journal block 1 to invalidation record 1. By way of another example, if the system were mapping journal block 5 to an invalidation record, 5/3=1.66 . . . and [1.66 . . . ]1=2, which maps journal block 5 to invalidation record 2.

Next, cache 104 can determine a mapped journal block based on a journal block. In some embodiments, cache 104 can use a modulo operation to determine a mapped journal block based on the journal block number. For example, for journal block 1, the system can compute 1 mod 3=1, which maps journal block 1 to mapped journal block 1. Similarly, if the system were mapping journal block 5 to a mapped journal block, 5 mod 3=2, which maps journal block 5 to mapped journal block 2 within invalidation record 2 (as determined earlier).

Lastly, cache 104 can determine an index in the mapped journal block that corresponds to an index in the underlying journal block. Some embodiments of cache 104 can use the same index in the mapped journal block as the index used in the underlying journal block. That is, when writing the corresponding journal block entries to invalidation data area 208, the journal block entries can be added at the same index, in the target_lba array of the mapped journal block, as used in a corresponding target_lba array of the journal block. Accordingly, the index in the mapped journal block can be easily and quickly determined based on the index in the underlying journal block.

To perform a reverse mapping (i.e., to determine a journal block and corresponding index based on an invalidation record, mapped journal block, and index), cache 104 can perform the reverse operations from those described above. For example, cache 104 can identify information about a memory address for an invalidated cache block based on metadata 302 stored in the mapped journal block. Cache 104 can determine the journal block number based on the invalidation record number, and the index for the journal block can be implied from the index used in the mapped journal block.

Figure 4:
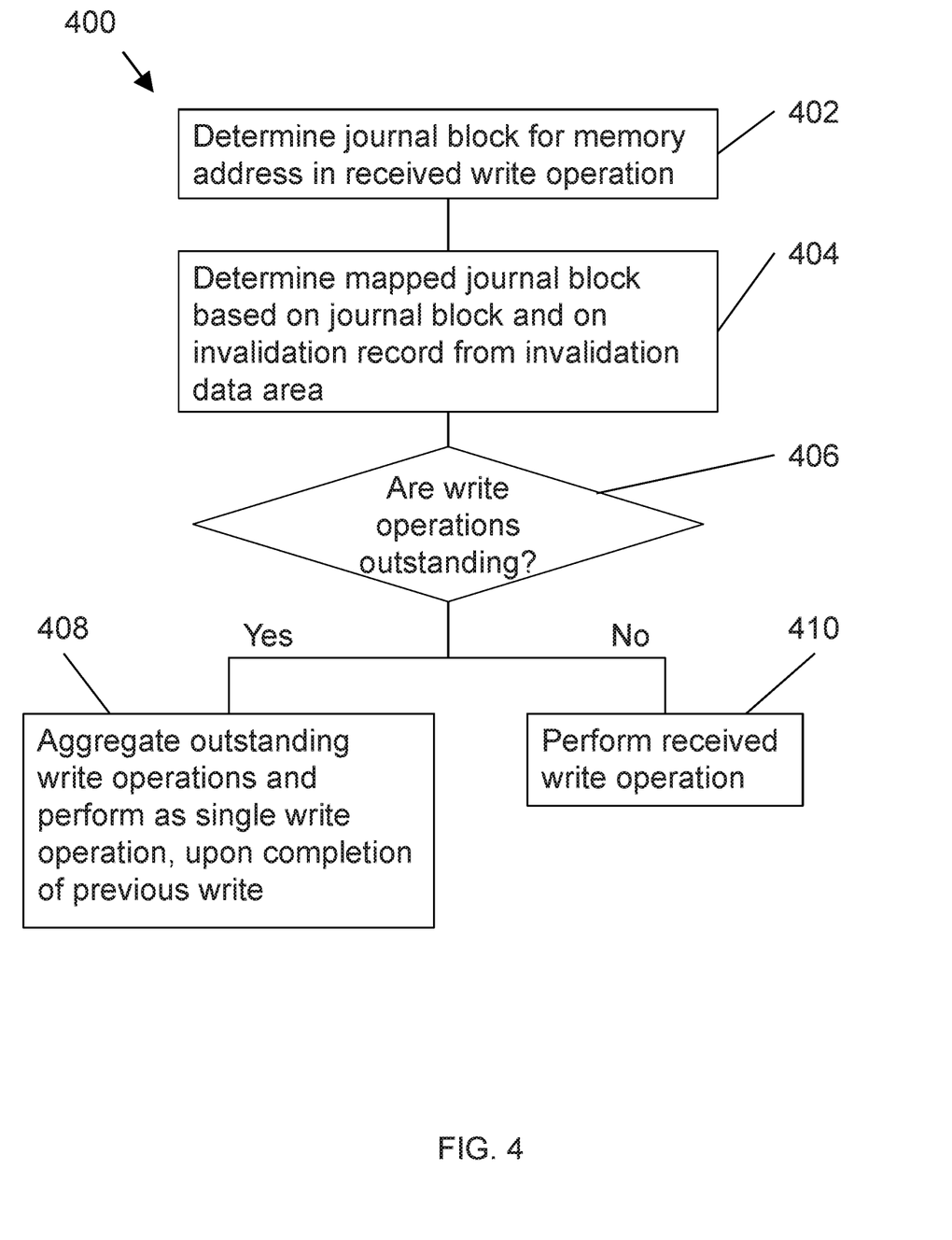
FIG. 4 illustrates an example method for invalidation using the invalidation data area, in accordance with some embodiments of the present disclosure.

FIG. 4 illustrates an example method 400 for invalidation using the invalidation data area, in accordance with some embodiments of the present disclosure. In some embodiments, method 400 can include determining a journal block for a memory address in a received write operation (step 402); determining a mapped journal block and offset based on the determined journal block and a corresponding invalidation record from the invalidation data area (step 404); determining whether there are write operations outstanding (step 406); if yes, aggregating the write operations and perform the write operations as a single write to the cache (step 408); if no, performing the received write operation (step 410).

First, method 400 determines a journal block for a memory address in a received write operation (step 402). Some embodiments of method 400 can identify the journal block based on the logical block address (LBA) in the received write operation. Or, upon a write hit (meaning that the LBA is previously cached), method 400 can identify the journal block based on the LBA at which the cache block is stored in the cache.

Then, method 400 proceeds to determine a mapped journal block based on the determined journal block and a corresponding invalidation record from the invalidation data area (step 404). In some embodiments, the invalidation record can be determined by performing division operations and ceiling operations on the journal block number. Some embodiments also can determine the index for the mapped journal block using the index used in the underlying journal block. For example, when the system uses the same indices for the mapped journal block and the underlying journal block, the index can be easily and quickly determined.

Then, method 400 can determine whether there are write operations outstanding (step 406). In some embodiments, this can be determined using an in-RAM data structure corresponding to the invalidation record. For example, the in-RAM data structure can contain a field ("outstanding") that identifies whether any write operations are outstanding. One advantage of using the in-RAM data structure is to avoid a relatively slower read operation to the underlying cache to retrieve the stored invalidation record.

If method 400 determines that write operations are outstanding (step 406: Yes), the write operations and perform the write operations can be aggregated as a single write to the cache (step 408). Some embodiments of method 400 queue subsequent writes upon a determination that write operations are outstanding. After the previous write operation is complete, method 400 writes the queued writes into the cache as a single write that contains the aggregate information of all the updates. In some embodiments, the aggregation can include identifying write operations that operate on the same data block, ordering the write operations based on timestamp, and determining the end result of the ordered write operations. In this manner, this batching or aggregation of write operations allows method 400 to reduce further the number of read and write operations used for invalidation. If it is determined that write operations are not outstanding (step 406: No), method 400 can proceed to perform the received write operation (step 410).

Figure 5:
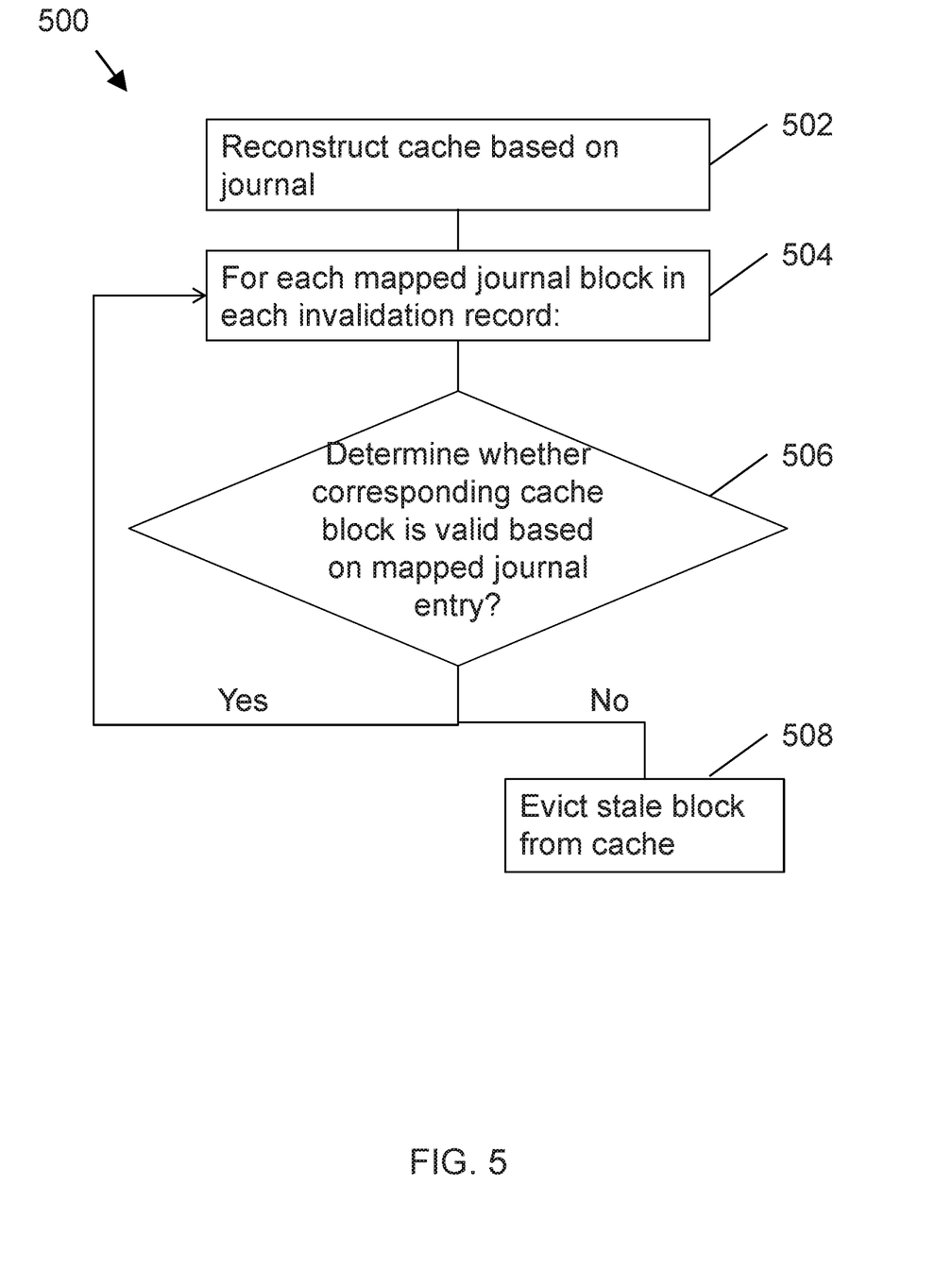
FIG. 5 illustrates an example method for cache recovery, in accordance with some embodiments of the present disclosure.

FIG. 5 illustrates an example method 500 for cache recovery, in accordance with some embodiments of the present disclosure. Cache recovery refers to a situation in which the cache can benefit from reconstruction based on the journal and on the invalidation data area, for example after a power outage, unclean system shutdown, or other unexpected event. Method 500 can include reconstructing the cache based on the journal (step 502); then, for each mapped journal block in each invalidation record (step 504): determining whether a corresponding cache block is valid based on mapped journal entry (step 506); if yes, going back to step 504, if no, evicting stale block from cache (step 508).

First, method 500 reconstructs the cache based on the journal (step 502). Some embodiments of the system can make an assumption that the contents of the journal generally represent valid data that should be reconstructed into the cache. In some embodiments, the system can reconstruct the cache by retrieving each journal block from the journal, and iterating processing the metadata in each journal block to reconstruct each cache block. However, the journal block metadata can in fact contain cache blocks that might have been invalidated. The system can later correct this initial assumption of generally valid data based on the invalidation data area. For example, the system can identify invalid cache blocks based on the invalidation data area, and evicting those stale cache blocks from the cache.

Next, method 500 iterates through each mapped journal block in each invalidation record (step 504). For each mapped journal block, the metadata is processed in the mapped journal block to determine whether the corresponding cache blocks are in fact valid or invalid (step 506). Some embodiments can determine whether a cache block is valid by determining whether the metadata in the mapped journal block is consistent with the underlying metadata in the underlying journal block. For example, the consistency of the underlying metadata in the underlying journal block can be determined by locating the corresponding journal block number and index based on division operations, ceiling functions, and modulo operations. Then, the metadata stored at the determined journal block number and determined index can be prepared with the metadata stored in the mapped journal block. For example, assume that method 500 identifies, based on the mapped journal block, that memory address 8 is expected to be found at underlying journal block 1, index 3. Method 500 can then retrieve the corresponding contents of journal block 1, at index 3 of the metadata. If that journal block in fact tracks a cache block corresponding to memory address 8, it can be determined that the cache block corresponding to memory address 8 to be invalid, because the expected cache block based on the invalidation data area and mapped journal block in fact matches the actual cache block tracked in the corresponding underlying journal block. On the other hand, assume that method 500 identifies, based on the mapped journal block, that a cache block corresponding to memory address 16 is expected to be found at underlying journal block 1, index 4. If the actual cache block stored at underlying journal block 1, index 4 does not correspond to memory address 16, method 500 can proceed to process the next metadata, because the cache block can stay in the cache when the expected cache block based on the invalidation data area and mapped journal block does not match the actual cache block tracked in the corresponding underlying journal block.

If the metadata matches, method 500 can determine the cache block to be invalid (step 506: No). Accordingly, method 500 can evict, or discard, the invalid (i.e., stale) block from the cache (step 508). If the metadata does not match, method 500 can proceed to process the next metadata corresponding to the mapped journal block, or proceed to process the next mapped journal block if method 500 has processed all metadata in the mapped journal block (step 506: Yes).

The invalidation data area can further provide some additional benefits around (1) transparent caching, and (2) dynamic cache mode switching between a write-back and a write-through mode. Transparent caching refers to an ability for an administrator or user to remove the cache from the system at will. Dynamic cache mode switching refers to an ability for an administrator or user to switching the cache mode between a write-back and write-through mode, without having to power down the system. The invalidation data area can allow transparent caching and dynamic mode switching without introducing significant latency to ongoing I/O operations. In some embodiments, the cache can avoid latency by discarding all data. If the cache is in write-back mode, the cache generally flushes its dirty data to the underlying storage device (i.e., "writes back" the data) before the cache can discard or evict the data. Previously, the cache flushed its data by pausing all outstanding I/O operations before flushing. However, holding or pausing all outstanding I/O operations can introduce undesired latency, as there's no upper bound to the amount of time used to flush. Example factors that can affect flush time can include the amount of dirty data, randomness, disk speed, etc. In some embodiments, the invalidation data area improves ongoing I/O operations by putting the cache in pause mode and servicing I/O operations as follows:

1) The cache passes through cache misses
2) The cache services read hits
3) The cache uses the invalidation data area to invalidate write hits and passes through the writes to underlying storage.

After the cache flush is complete, the cache can safely discard all the data.

Those of skill in the art would appreciate that various illustrations described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology.

Furthermore, an implementation of the invalidation data area may be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The methods may also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b)

reproduction in a different material form. Significantly, the systems and methods described herein may also be embodied in other specific forms without departing from the spirit or essential attributes thereof, and accordingly, reference should be had to the following claims, rather than to the foregoing specification, as indicating the scope of the systems and methods.

The present disclosure has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for recovery of a cache, the method comprising:
   determining an initial reconstruction of the cache based on a journal of the cache, wherein one or more journal blocks are associated with the journal, and wherein the one or more journal blocks are represented by one or more mapped journal blocks associated with an invalidation record in an invalidation data area of the cache;
   for each of the one or more mapped journal blocks,
      determining whether a corresponding data block tracked in the journal is valid, based on the mapped journal block; and
      if the corresponding data block is determined not to be valid, evicting the corresponding data block from the initial reconstruction of the cache.

2. The method of claim 1, wherein determining the initial reconstruction comprises recovering data blocks and metadata describing the data blocks, wherein the recovered data blocks and metadata are recovered from the journal.

3. The method of claim 1, wherein determining whether the corresponding data block tracked in the journal is valid comprises comparing metadata describing the corresponding data block tracked in the journal with metadata describing the corresponding data block tracked in the mapped journal block.

4. The method of claim 3, wherein comparing the metadata comprises comparing a first memory address and first index for the corresponding data block tracked in the journal with a second memory and second index tracked in the mapped journal block.

5. The method of claim 1, wherein the invalidation data area is on a separate region of the cache from the journal.

6. The method of claim 1,
   wherein the cache comprises a content locality cache; and
   wherein the journal tracks at least one of associated data blocks and independent data blocks in the content locality cache.

7. A system for recovery of a cache, the system comprising:
   a cache comprising a journal and an invalidation data area; and
   a means for:
      determining an initial reconstruction of the cache based on the journal of the cache, wherein one or more journal blocks are associated with the journal, and wherein the one or more journal blocks are represented by one or more mapped journal blocks associated with an invalidation record in the invalidation data area of the cache;
      for each of the one or more mapped journal blocks,
         determining whether a corresponding data block tracked in the journal is valid, based on the mapped journal block; and
         if the corresponding data block is determined not to be valid, evicting the corresponding data block from the initial reconstruction of the cache.

8. The system of claim 7, wherein determining the initial reconstruction comprises recovering data blocks and metadata describing the data blocks, wherein the recovered data blocks and metadata are recovered from the journal.

* * * * *